US010606876B2

(12) United States Patent
Jarrett et al.

(10) Patent No.: US 10,606,876 B2
(45) Date of Patent: Mar. 31, 2020

(54) TOPIC RECOMMENDATION

(71) Applicant: ENT. SERVICES DEVELOPMENT CORPORATION LP, Houston, TX (US)

(72) Inventors: Lynda K. Jarrett, Houston, TX (US); Sharad Mathur, Palo Alto, CA (US); Bala Sita Rama Raju Penumarthi, Palo Alto, CA (US); Rashmi Gururaja, Austin, TX (US); Gearoid Hynes, Galway (IE); Erin E. Tilley, Austin, TX (US)

(73) Assignee: ENT. SERVICES DEVELOPMENT CORPORATION LP, Houston, TX (US)

(*) Notice: Subject to any disclaimer, the term of this patent is extended or adjusted under 35 U.S.C. 154(b) by 151 days.

(21) Appl. No.: 15/305,248

(22) PCT Filed: Jun. 6, 2014

(86) PCT No.: PCT/US2014/041311
§ 371 (c)(1),
(2) Date: Oct. 19, 2016

(87) PCT Pub. No.: WO2015/187176
PCT Pub. Date: Dec. 10, 2015

(65) Prior Publication Data
US 2017/0097989 A1  Apr. 6, 2017

(51) Int. Cl.
*G06F 16/338* (2019.01)
*G06F 16/33* (2019.01)
(Continued)

(52) U.S. Cl.
CPC ........ *G06F 16/338* (2019.01); *G06F 16/2465* (2019.01); *G06F 16/3344* (2019.01);
(Continued)

(58) Field of Classification Search
CPC .............. G06Q 10/1095; H04L 65/403; G06F 17/30011; G06F 17/30994;
(Continued)

(56) References Cited

U.S. PATENT DOCUMENTS

| 8,280,783 | B1* | 10/2012 | Brownell | G06Q 30/00 705/26.1 |
| 2008/0071929 | A1 | 3/2008 | Motte et al. | |
| 2008/0300944 | A1* | 12/2008 | Surazski | G06Q 10/06311 705/7.13 |
| 2010/0325205 | A1 | 12/2010 | Murphy et al. | |
| 2012/0041953 | A1 | 2/2012 | Dumais et al. | |
| 2012/0323575 | A1 | 12/2012 | Gibbon et al. | |
| 2013/0067364 | A1 | 3/2013 | Berntson et al. | |

(Continued)

FOREIGN PATENT DOCUMENTS

WO   WO-2014005657   1/2014

OTHER PUBLICATIONS

De Spindler, A., et al.; "Using Synchronised Tag Clouds for Browsing Data Collections"; 2011; 15 pages www.globis.ethz.ch/script/publication/download?docid=625.

(Continued)

*Primary Examiner* — Yuk Ting Choi
(74) *Attorney, Agent, or Firm* — Sheppard Mullin Richter & Hampton LLP

(57) ABSTRACT

In one implementation, a system for topic recommendation includes an information engine receives topic information relating to a number of events. In addition, the system includes an analysis engine performs a text analysis on the received topic information. In addition, the system includes an index engine indexes the topic information based on the text analysis. In addition, the system includes a display engine compares a search term to the indexed topic information and displays a number of topics on a display of a mobile device, wherein the number of topics are displayed in a size that corresponds to a quantity of topic information associated with each of the number of topics.

16 Claims, 4 Drawing Sheets

(51) Int. Cl.
*G06F 16/9535* (2019.01)
*G06F 16/9032* (2019.01)
*G06Q 50/10* (2012.01)
*G06Q 10/10* (2012.01)
*G06Q 30/02* (2012.01)
*G06F 16/35* (2019.01)
*G06F 16/2458* (2019.01)

(52) U.S. Cl.
CPC ...... *G06F 16/353* (2019.01); *G06F 16/90324* (2019.01); *G06F 16/9535* (2019.01); *G06Q 10/10* (2013.01); *G06Q 30/0282* (2013.01); *G06Q 50/10* (2013.01)

(58) Field of Classification Search
CPC ............. G06F 17/30696; G06F 16/248; G06F 16/338; G06F 16/3322; G06F 16/90324; G06F 16/90328; G06F 16/532; G06F 16/54; G06F 16/44; G06F 16/58
See application file for complete search history.

(56) References Cited

U.S. PATENT DOCUMENTS

| | | |
|---|---|---|
| 2013/0091088 A1 | 4/2013 | Forman et al. |
| 2014/0095216 A1 | 4/2014 | Radhakrishnan et al. |
| 2014/0156681 A1 | 6/2014 | Lee et al. |
| 2014/0229471 A1* | 8/2014 | Galvin, Jr. .......... G06F 17/3061 707/725 |
| 2014/0278408 A1* | 9/2014 | Park ...................... G06F 3/0488 704/235 |
| 2014/0297666 A1* | 10/2014 | Morris ................ G06F 16/2453 707/754 |
| 2014/0317104 A1* | 10/2014 | Isaacs ............... G06F 17/30554 707/728 |

OTHER PUBLICATIONS

PCT Search Report/Written Opinion ~ Application No. PCT/US2014/041311 dated Jan. 30, 2015 ~ 14 pages.

* cited by examiner

TOPIC RECOMMENDATION

CLAIM FOR PRIORITY

The present application is a national stage filing under 35 U.S.C. § 371 of PCT application number PCT/US2014/041311, having an international filing date of Jun. 6, 2014, the disclosure of which is hereby incorporated by reference in its entirety.

BACKGROUND

Attendees at large conferences can experience difficulties when determining which presentations to attend, such as sessions, demos, and/or exhibits. The attendees of the conference may want to attend presentations that correspond to their particular interests. In some cases, there can be a finite number of presentations that the attendee can attend over the duration of the conference. Searching and planning a schedule to attend events at the conference that are of interest to the attendee can be a difficult and/or time consuming process.

DETAILED DESCRIPTION

Figure 1:
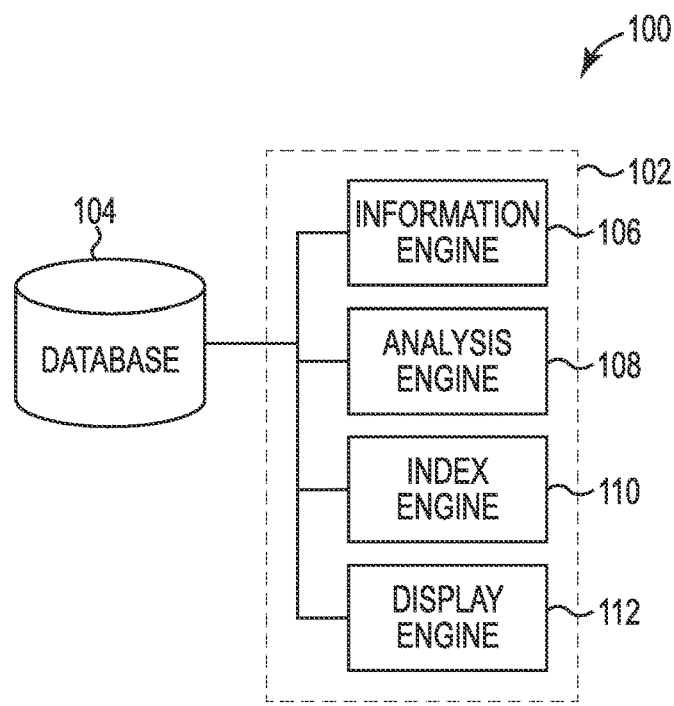
FIG. 1 illustrates a diagram of an example of a system for topic recommendation according to the present disclosure.

Topic recommendation can include a user interface that enables searching for topics at an event (e.g., conference, presentations, plurality of topics being presented, etc.). The user interface can be presented on a mobile device such as a cell phone, tablet, and/or personal computer, among other mobile devices. Topic recommendation, as described herein, can be implemented for a number of different applications. However, for ease of description, the application will describe topic recommendation in connection with events that relate to events, such as conferences that include a plurality of presentations that relate to particular topics.

Topic recommendation can include receiving information that relates to an event, such as a conference, with a plurality of presentations that cover a plurality of different topics. For example, a conference can include a conference on technology. In this example, the conference on technology can have a plurality of presentations on various topics of technology. Information relating to the event can include, but is not limited to: an abstract of each of the presentations, an overview of each of the presentations, an article relating to each of the presentations, and/or a title of each of the presentations.

A text analysis can be performed on the information relating to the event. The text analysis can be performed to generate a database of text analysis information. In some embodiments, the text analysis information can be indexed in a database to provide more robust searching capabilities compared to a database in previous methods. A search term (e.g., search word, text, natural language text, etc.) can be received and compared to the text analysis information to find a portion of topics and/or a portion of the plurality of presentations that relate to the search term. The search term can include a description of an interest of a user. For example, the search term can include phrases such as "Big Data" and/or "Cloud Computing" to describe the interest of a user.

Topic recommendation can include displaying the portion of topics from the plurality of topics in a text cloud to display on a mobile device (e.g., cell phone, tablet, etc.). Displaying the text cloud can include adjusting a text size of each topic in the text cloud based on a relatedness with the search term. For example, if the search term is "Big Data" the topics relating to big data can have a larger size compared to other topics in the text cloud.

Furthermore, topic recommendation can include recommending a number of presentations at the event based on the received search term and the time each of the number of presentations are to be presented at the event. For example, recommending the number of presentations can include displaying a number of presentations at the event that relates to the search term and can be attended by a user based on a time the presentation is presented at the event.

Topic recommendation as described herein includes many advantages over prior methods. Displaying the text cloud with an adjusted text size of each topic in the text cloud based on a relatedness with the search term can make searching for desired topics that are related to the search term easier to display on a mobile device that can have a relatively smaller screen size compared to other computing device displays. Thus, the text cloud can make topics that are more related to the search term easier to identify compared to previous methods. In addition, the text cloud can be dynamically updated as an event progresses so that a user can more easily identify topics that are more related to the search term as information relating to the topic changes.

FIG. 1 illustrates a diagram of an example of a system 100 for topic recommendation according to the present disclosure. The system 100 can include a database 104, a topic recommendation system 102, and/or a number of engines. The topic recommendation system 102 can be in communication with the database 104 via a communication link, and can include the number of engines including, but not limited to: an information engine 106, an analysis engine 108, an index engine 110, and/or a display engine 112. The topic recommendation system 102 can include additional or fewer engines that are illustrated to perform the various functions as will be described in further detail in connection with FIG. 3, FIG. 4, and/or FIG. 5.

The number of engines (e.g., information engine 106, analysis engine 108, index engine 110, display engine 112, etc.) can include a combination of hardware and programming, but at least hardware, configured to perform a number of functions described herein (e.g., receives topic information relating to a number of events, performs a text analysis on the received topic information, indexes the topic information based on the text analysis, compares a search term to the indexed topic information and displays a number of topics on a display of a mobile device, wherein the number of topics are displayed in a size that corresponds to a quantity of topic information associated with each of the number of topics, etc.). The programming can include program instructions (e.g., software, firmware, etc.) stored in a memory resource (e.g., computer readable medium, machine readable medium, etc.) as well as hard-wired program (e.g., logic).

The information engine 106 can include hardware and/or a combination of hardware and programming, but at least hardware that receives topic information relating to a number of events. Receiving topic information relating to a number of events can include receiving topic information relating to presentations of an event such as a conference. For example, the topic information can include, but is not limited to: an abstract of a presentation to be presented at a conference, an overview of a presentation to be presented at a conference, an article that a presentation is based on, and/or a title of a presentation to be presented at a conference.

The analysis engine 108 can include hardware and/or a combination of hardware and programming, but at least hardware that performs a text analysis on the received topic information. Performing a text analysis can include performing text analytics on the received topic information. As used here, performing text analysis includes linguistic, statistical, and/or machine learning techniques to model and structure the topic information. Performing the text analysis can provide additional information (e.g., synonyms, relationships between topics, etc.) that can be utilized when the topic information is indexed by the index engine 110.

The index engine 110 can include hardware and/or a combination of hardware and programming, but at least hardware that indexes the topic information based on the text analysis. Indexing the topic information can include creating a database index of the topic information. Indexing the topic information can include organizing the topic information in a database to increase a relative speed of data retrieval.

The display engine 112 can include hardware and/or a combination of hardware and programming, but at least hardware that compares a search term to the indexed topic information and displays a number of topics on a display of a mobile device, wherein the number of topics are displayed in a size that corresponds to a quantity of topic information associated with each of the number of topics. Comparing the search term to the indexed topic information can include searching an indexed database comprising the topic information of the event. Comparing the search term to the indexed topic information can include utilizing a number of synonyms and/or relationship information associated with the search term to compare to the indexed topic information.

Displaying the number of topics on a display of the mobile device can include displaying the number of topics as a text cloud, wherein the text cloud includes textual representations of the number of topics in a size relative to the relatedness between the topic and the search term. For example, topics that are more closely related to the search term can be a relatively larger size than topics that are displayed that are less closely related to the search term. By displaying the number of topics in a text cloud can enable the number of topics to be displayed on a mobile device.

The display engine can also display a number of the presentations that relate more closely to the search term compared to other presentations that are being presented at the event. The display engine can also display the number of presentations based on a time the presentations are to be presented at the event. For example, there can be presentations that are presented at the same time. In this example, a time of the presentation can be included in the number of presentations that are displayed. In some embodiments, presentations that are no longer available to attend may not be displayed, even though the presentations are more similar to the search term.

Figure 2:
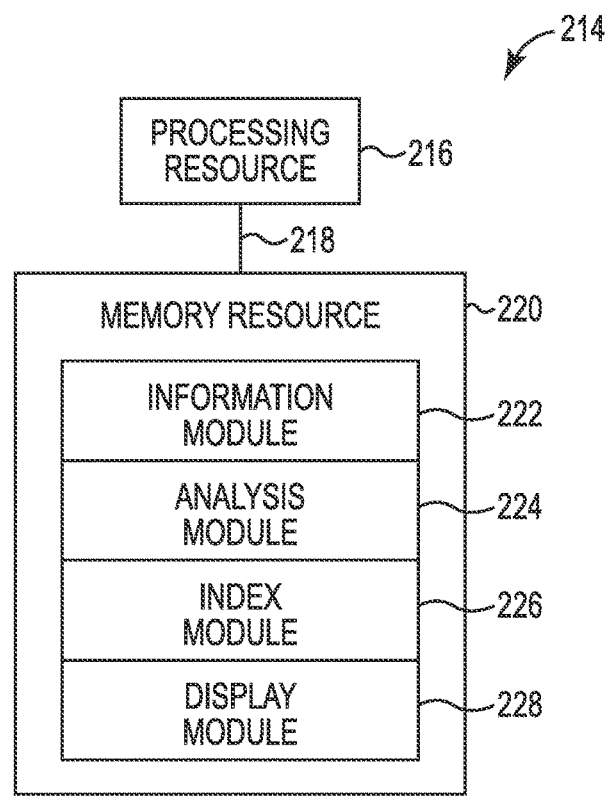
FIG. 2 illustrates a diagram of an example computing device according to the present disclosure.

FIG. 2 illustrates a diagram of an example computing device 214 according to the present disclosure. The computing device 214 can utilize software (e.g., program instructions), hardware, firmware, and/or logic to perform a number of functions described herein.

The computing device 214 can include a combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing program instructions stored by a memory resource 220.

Processing resource 216 may be implemented in a single device or distributed across multiple devices. The program instructions (e.g., computer and/or machine readable instructions (CRI/MRI)) can include instructions stored on the memory resource 220 and executable by the processing resource 216 to implement a desired function (e.g., receive information relating to a number of presentations that include a plurality of topics, perform text analysis on the plurality of topics to generate a database of text analysis information relating to the plurality of topics, receive a search term to compare to the text analysis information, and/or display a portion of topics from the plurality of topics in a text cloud to display on a mobile device, wherein each of the portion of topics comprise a link to a portion of the number of presentations that relate to a corresponding topic, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

As shown in the example of FIG. 2, the computing device 214 can include a number of modules (e.g., information module 222, analysis module 224, index module 226, display module 228). As used herein, the term module is intended to include program instructions that when executed by the processing resource 216 can perform a number of functions. The number of modules can be combined with other modules or be sub-modules of other modules. The number of modules can be stored in a single memory resource. For example, the analysis module 224 and the index module 226 can be sub-modules and/or contained within the same computing device. In another example, the number of modules can comprise individual modules at separate and distinct locations (e.g., CRM, etc.).

Each of the number of modules can include instructions that when executed by the processing resource 216 can function as a corresponding engine as described herein. For example, the information model module 222 can include instructions that when executed by the processing resource 216 can function as the information engine 106. In another example, the analysis module 224 can include instructions that when executed by the processing resource 216 can function as the analysis engine 108. In another example, the index module 226 can include instructions that when executed by the processing resource 216 can function as the index engine 110. In another example, the display module 228 can include instructions that when executed by the processing resource 216 can function as the display engine 112.

Figure 3:
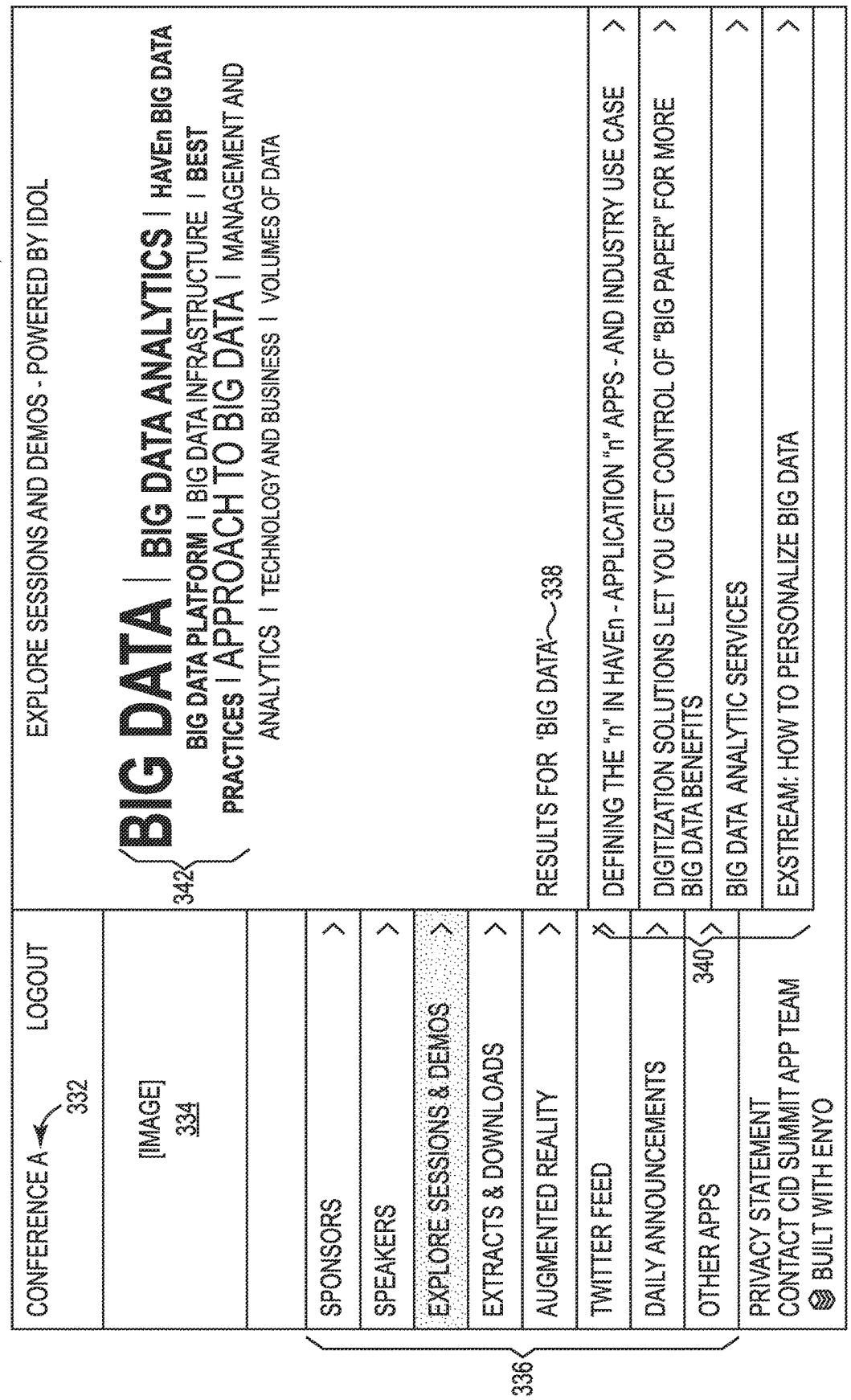
FIG. 3 illustrates an example of a user interface for topic recommendation according to the present disclosure.

FIG. 3 illustrates an example of a user interface 330 for topic recommendation according to the present disclosure. The user interface 330 can be displayed on a mobile device (e.g., cell phone, tablet, etc.). The user interface 330 can include a title of the event 332. The title of the event 332 can include a description of a conference that corresponds to the displayed information. The title of the event 332 can include a date of the event as well as a general description of what the event includes.

The user interface 330 can include an image 334. The image 334 can be an image that corresponds to the event. For example, events can include an image that is a visual representation of the event. In addition, the user interface 330 can include a number of categories 336 of the event. For example, the number of categories can include, but are not limited to: sponsors of the event, speakers and/or presenters giving presentations at the event, downloadable material that corresponds to the event, a social network feed (e.g., Twitter® feed, Facebook® feed, etc.), and/or other applications that correspond to the event.

The user interface 330 can include a text cloud 342. The text cloud 342 can be displayed on a mobile device. The text cloud 342 can be presented based on a received search term. For example, the text cloud 342 can be displayed based on a search term such as "Big Data". As described herein, the text cloud 342 can alter a size of each of the displayed topics based on a relative relatedness with the search term. For example, when the search term is "Big Data", the topic big data in the text cloud can be relatively larger in size compared to other topics that are displayed. In addition, when the search term is "Big Data", the topic big data analytics can be relatively larger than other topics, but relatively smaller than the topic big data. In some embodiments, the text cloud 342 displays the number of topics on a single display window of the mobile device. That is, a user can view a display of the text cloud 342 without having to scroll or alter a view of the user interface 330 while utilizing a mobile device.

In some embodiments, each of the number of topics in the text cloud 342 can include a link to a corresponding portion of presentations or events that relate to a corresponding topic. For example, the topic "Big Data" in the text cloud 342 can include a link that when selected can display a set of results 340 that includes a portion of the presentations to be presented at the event that relate to the topic "Big Data". As described further herein, each of the presentations in the set of results 340 can also include a link that when selected can display additional information relating to the corresponding presentation.

In some embodiments, the text cloud 342 can be dynamically updated. That is, the portion of topics from the plurality of topics that are displayed in the text cloud 342 can be dynamically altered as the event proceeds. For example, as presentations are completed, the text cloud 342 can be altered to reflect fewer and fewer related events that are within each of the plurality of topics. In a specific example, the topic of "Big Data" in the text cloud 342 can be dynamically updated to reflect when presentations on big data are completed, thus decreasing the number of presentations at the conference that are related to big data.

In addition, or alternatively, the text cloud 342 can be dynamically updated to reflect additional information that is received over a period of time. For example, the text cloud 342 can be dynamically updated as social media information relating to the topics within the text cloud 342 is received. In this example, the social media information can include, but is not limited to information received from social media outlets such as Twitter®, Facebook®, blogs, chat rooms, message board comments left regarding the event, message board comments left regarding a particular presentation, among other social media information.

A particular topic can increase and/or decrease in size as more social media information relating to particular topics within the text cloud 342 is received. For example, the topic "Best Practices" can increase in size and/or change font (e.g., bold, italics, etc.) as additional social media information is received that relates to the search term and best practices. In this example, the social media information can be included in the "Best Practices" topic by relating to the best practices of big data when the search term is big data.

In some embodiments, the text cloud 342 can be dynamically updated to display topics that are most related to presentations that are either in progress or presentations that can be attended by a user and the social media information received that corresponds to the topics within the text clouds 342. For example, the event can last a total of two days and some presentations can be presented on day one and other presentations can be presented on day two. In this example, the text cloud 342 on day two may not include the related presentations from day one and/or the social media information relating to the related presentations from day one. In this embodiment, it can be advantageous to determine what presentations are still available that are most related to a particular topic and/or search term. In other embodiments, the text cloud 342 on day two can include the related presentations from day one and/or the social media information relating to the related presentations from day one. In this embodiment, it can be advantageous to observe what past presentations (e.g., presentations that have already been presented at the event) are being discussed on social media outlets and/or what presentations may be related to particular topics and/or search terms even though they have already been presented.

The user interface 330 can include a set of results 340 with a title of the results 338. For example, the title of the results 338 can include "Results for 'Big Data'" and the set of results 340 can include a list of presentation titles from the event that correspond to the search term "Big Data". In some embodiments, the "Results for 'Big Data'" can correspond to selecting the text topic "Big Data" from the text cloud 342.

The set of results 340 can be based on a time that each of the presentations are to be presented at the event. For example, if the event "HP Big Data Analytics Services" was presented at a time previous to the searching of "Big Data", the event may not be listed in the set of results 340 since a user may not be able to attend the event.

The set of results 340 can be listed in order based on how related the event is to the search term and/or the selected topic. For example, the event listed at the top of the set of results 340 can be relatively more related to the search term and/or selected topic from the text cloud 342. The set of results 340 can each include an embedded link to additional information relating to a corresponding presentation. The set of results 340 can be a recommendation of a portion of presentations or events from the number of presentations or events that include a relatively high quantity of topic information relating to each corresponding topic within the text cloud 342.

In some embodiments, the set of results 340 can be utilized in recommending a schedule of events based on the search term. For example, a schedule of events can be arranged that includes events that most closely relate to the search term and/or a topic selected from the text cloud 342 and take into account a time that each of the recommended presentations will be presented. In some embodiments, multiple presentations can be recommended so that a user can attend a plurality of presentations over the course of the event. As described herein, a portion of the plurality of presentations can be at overlapping times during the course of the event. That is, there can be multiple presentations that relate to the same topic that are being presented at the same time.

The user interface 330 can enable searching for related presentations to a search term on a mobile device. For example, a user who is planning on attending or is currently attending a conference can search the information related to presentations at the conference on a mobile device to determine what presentations are most related to a preference of the user.

Figure 4:
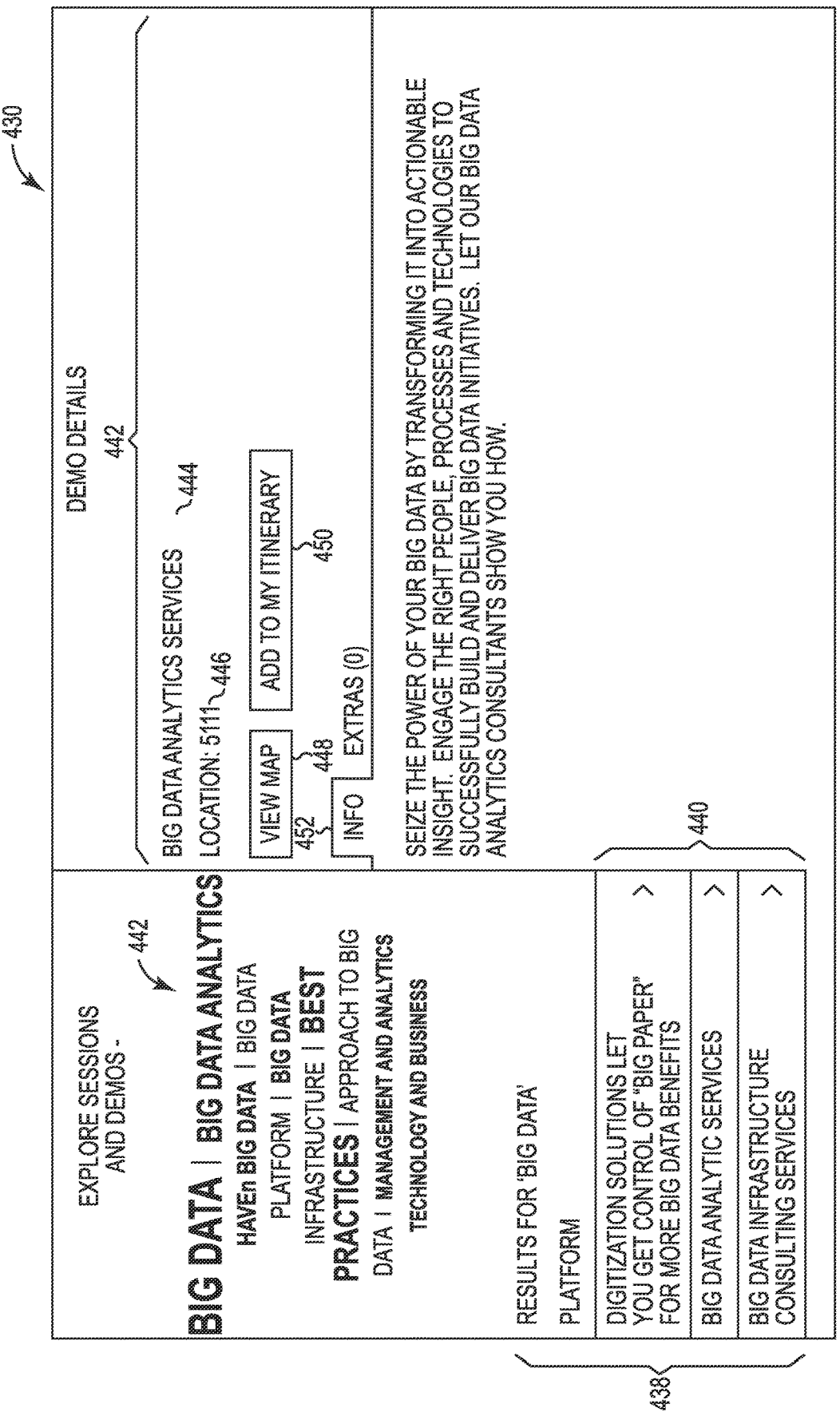
FIG. 4 illustrates an example of a user interface for topic recommendation according to the present disclosure.

FIG. 4 illustrates an example of a user interface 430 for topic recommendation according to the present disclosure. User interface 430 can be displayed when a presentation is selected from the set of results 340 as referenced in FIG. 3. The user interface 430 can be displayed on a mobile device to enable a user who is planning on attending or is currently attending an event to more easily search for presentations that correspond to a preference of the user compared to previous methods.

The user interface 430 can include the text cloud 442. The text cloud 442 can include the same and/or similar features as text cloud 342 as referenced in FIG. 3. For example, the text cloud 442 can list a plurality of topics from the event and organize the plurality of topics based on a size of the text. In this example, the size of the text of the topic can correspond to a relatedness of the topic when compared to a received search term. That is, topics that are displayed in a larger size include a topic that has a relatively higher relatedness to the search term compared to topics that are displayed in a smaller size.

The user interface 430 can include the set of results 440 with a title of results 438. The set of results 440 can be the same and/or similar set of results 340 as referenced in FIG. 3. The set of results 440 can include presentations that are related to the search term and/or to a selected topic from the text cloud 442. Each of the presentations listed in the set of results 440 can be selected and additional information can be presented that corresponds to the topic in a topic information window 442. For example, "HP Big Data Analytics Services" can be selected from the set of results 440 and additional information corresponding to HP Big Data Analytics Services presentation can be displayed in the topic information window 442.

The topic information window 442 can include the title of a presentation 444. In some embodiments, the topic information window 442 can include the location 446 of the presentation. For example, the event can include a plurality of presentations that are located in particular rooms of a conference center. In this example, the location can include a room number (e.g., 5111, Room 5111, etc.).

The topic information window 442 can include a view map button 448. The view map button 448 can be selected to display a map of the location where the event is being conducted. For example, the view map button 448 can display a map of a conference center where the event and/or the presentations are being presented. In this example, the view map button 448 can display a map of the conference center that includes a current location of the mobile device and/or the user. In some embodiments, the view map button 448 can provide a user with directions to a particular location of a selected presentation.

The topic information window 442 can include an add to my itinerary button 450. The add to my itinerary button 450 can add information from the selected presentation to an itinerary window (not shown). The itinerary window can display a schedule of presentations for a user. For example, a user can add a number of presentations to the itinerary window that can be utilized to organize the added number of presentations. Organizing the added number of presentations can include adding a link to the information window on a calendar that includes time slots to position each of the added number of presentations to particular time periods.

The topic information window 442 can include an information tab 452 that includes a description of the presentation. In some embodiments, the information tab 452 can include an abstract from a published document that corresponds to the presentation. In some embodiments, the information tab 452 can include links to the published document that corresponds to the presentation. The information tab 452 can include various information relating to the presentation to give a representation of what the presentation will cover.

Figure 5:
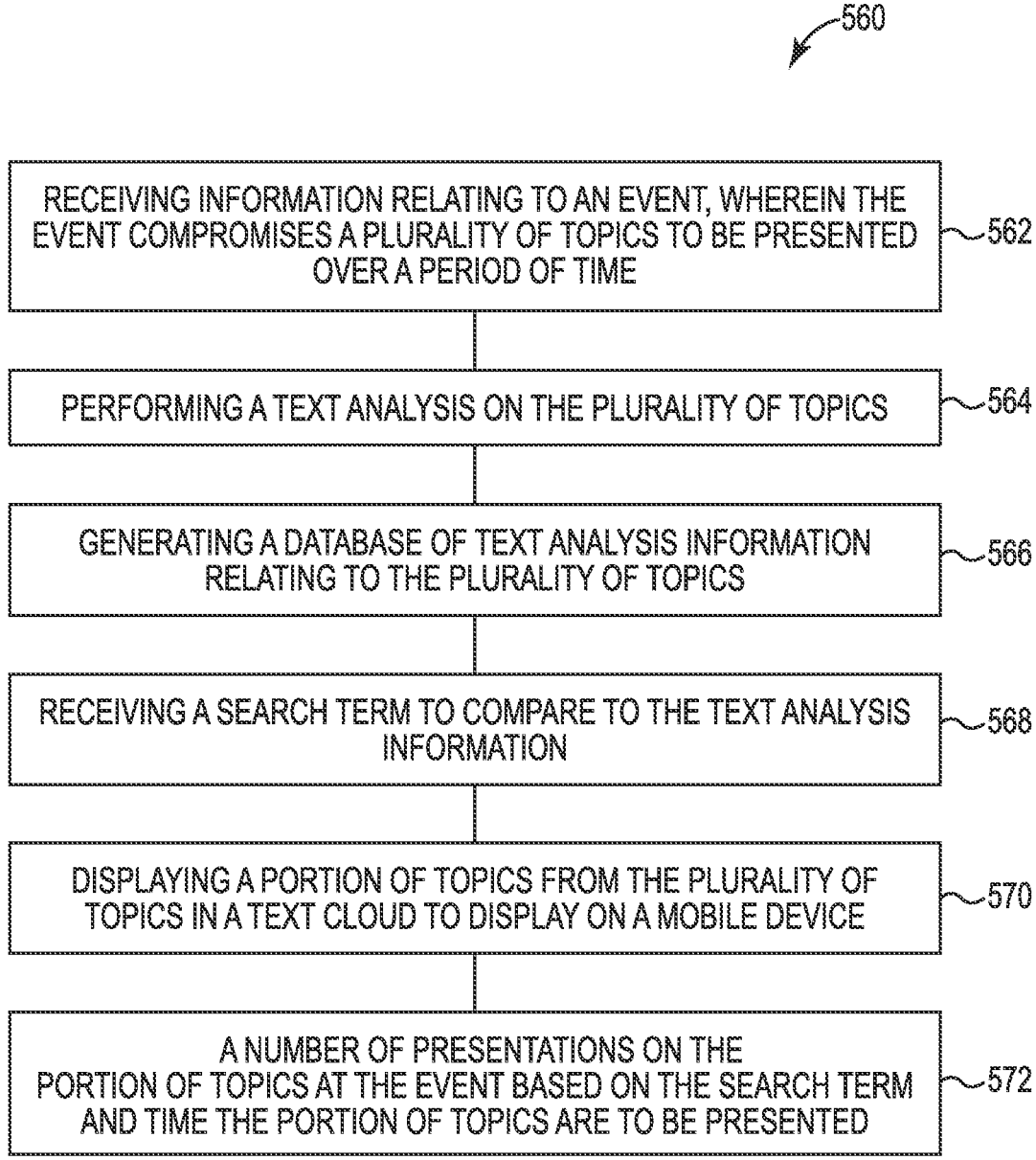
FIG. 5 is a flow chart of an example of a method for topic recommendation to the present disclosure.

FIG. 5 is a flow chart of an example of a method 560 for topic recommendation to the present disclosure. Method 560 can be performed, for example, using engines and/or modules as discussed in FIG. 1 and FIG. 2. The method 560 can enable a user to search and plan for an event via a mobile device. The event can include a conference that includes a plurality of presentations that cover a variety of topics.

At 562, the method 560 can include receiving information relating to an event, wherein the event comprises a plurality of topics to be presented over a period of time. Receiving information relating to the event can include receiving published documents that will be referenced in a plurality of presentations, abstracts of presentations to be presented, general topics to be presented, name of the presentor of each of the plurality of presentations, and/or other information that relates to each of a plurality of presentations. The information can be received from an organizer of the event, such as an event manager.

At 564, the method 560 can include performing a text analysis on the plurality of topics. Performing the text analysis on the plurality of topics can include receiving the information relating to the event and performing a text analysis on the information. The text analysis can provide a better understanding of how each of the plurality of presentations relate to other topics. For example, the text analysis can analyze a plurality of terms within the received information. In this example the text analysis can provide synonyms for topics within the received information to help provide a more robust set of information relating to the event.

At 566, the method 560 can include generating a database of text analysis information relating to the plurality of topics. Generating the database of text analysis information can include indexing the text analysis information to provide a database that can be utilized for searching information.

At 568, the method 560 can include receiving a search term to compare to the text analysis information. Receiving a search term can include receiving a search term from a user via a mobile device. The search term can include a description of topics that the event may be covering. For example, the search term can include a description such as "Big Data". In this example, the search term describes interests of a user in topics at the event that relate to big data.

At 570, the method 560 can include displaying a portion of topics from the plurality of topics in a text cloud to display on a mobile device. Displaying the portion of topics can include displaying a text cloud that displays each of the topics based on a relatedness to the received search term. For example, topics with a greater relatedness to the search term can be displayed in a relatively larger size compared to topics with a lesser relatedness to the search term. The relatedness can be based on a quantity of related terms within information that corresponds to a particular presentation. For example, a search term can be received that includes the phrase "Big Data". In this example, the topics with the greatest quantity of the phrase big data and/or synonyms to the phrase big data.

At 572, the method 560 can include recommending a number of presentations on the portion of topics at the event based on the search term and time the portion of topics are to be presented. Recommending the number of presentations can include providing a list to a mobile device with a number of presentations that relate to the received search term and/or a number of presentations that relate to a selected topic from the text cloud. The recommended number of presentations can include presentations based on a time that the presentations are presented at the event. For example, the time that the presentation is presented at the event can include a date and/or time that the presentations is scheduled to be presented. The recommended number of presentations can be altered as presentations occur during the event. For example, the recommended number of presentations can be eliminated from the list if the presentation was conducted at a time prior to the search term request.

The method 560 can provide a more robust search query for searching and organizing an agenda when attending an event such as a conference. The method 560 can also provide recommended presentations for a user based on a search term that is provided by a user and based on a time of the plurality of presentations. The method 560 can be implemented on a mobile device to provide a user of the mobile device with searchable information relating to an event. The method 560 can be utilized to search the plurality of presentations for an event and determine what presentations are most related to a particular topic.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for topic recommendation, comprising:
   a processing resource; and
   a non-transitory computer readable medium storing instructions executable by the processing resource to
      receive topic information relating to a number of events;
      perform a text analysis on the received topic information to generate a database of text analysis information;
      index the text analysis information based on the text analysis;
      compare a search term to the indexed topic information;
      responsive to the compare, display a number of topics on a display of a mobile device, wherein the number of topics are displayed in a size that corresponds to a quantity of topic information associated with each of the number of topics; and
   responsive to a user selecting text, arrange a schedule of the events that most closely relate to the topic corresponding to the selected text; and
   alter a text size of each of the topics based on a relative quantity of terms within the text analysis information that are related to the search term.

2. The system of claim 1, wherein the instructions are executable by the processing resource to display the number of topics as a text cloud on a single display window of the mobile device.

3. The system of claim 1, wherein each of the number of topics includes a link to a corresponding portion of events that relate to a corresponding topic.

4. The system of claim 1, wherein the instructions are executable by the processing resource to recommend a portion of events from the number of events that include a relatively high quantity of topic information relating to each corresponding topic.

5. The system of claim 1, wherein the number of events include presentations that include topic information relating to the topic information.

6. The system of claim 1, wherein the topic information includes at least one of:
   an abstract of a presentation;
   an overview of a presentation;
   an article of a presentation; and
   a title of a presentation.

7. A non-transitory computer readable medium storing instructions executable by a processing resource to:
   receive information relating to a number of presentations that include a plurality of topics;
   perform text analysis on the plurality of topics to generate a database of text analysis information relating to the plurality of topics;
   receive a search term;
   compare the search term to the text analysis information;
   responsive to the compare, display a portion of topics from the plurality of topics in a text cloud to display on a mobile device, wherein each of the portion of topics comprise a link to a portion of the number of presentations that relate to a corresponding topic;

responsive to a user selecting text in the displayed text cloud, arrange a schedule of the presentations that most closely relate to the topic corresponding to the selected text; and alter a text size of each of the portion of topics in the text cloud based on a quantity of related terms within the text analysis information that are related to the search term.

8. The medium of claim 7, comprising instructions executable to dynamically update the portion of topics from the plurality of topics based on received social media information relating to the portion of topics.

9. The medium of claim 7, comprising instructions executable to:

receive a selection of a presentation from the portion of the number of presentations;

display presentation information corresponding to the selected presentation; and display location information corresponding to the selected presentation.

10. A method for topic recommendation, comprising:

receiving information relating to an event, wherein the event comprises a plurality of topics to be presented over a period of time;

performing a text analysis on the plurality of topics;

generating a database of text analysis information relating to the plurality of topics;

receiving a search term;

comparing the search term to the text analysis information;

responsive to the comparing, displaying a portion of topics from the plurality of topics in a text cloud to display on a mobile device;

recommending a number of presentations on the portion of topics at the event based on the search term and time the portion of topics are to be presented; and responsive to a user selecting text in the displayed text cloud, arranging a schedule of the presentations that most closely relate to the topic corresponding to the selected text; and alter a text size of each of the portion of topics in the text cloud based on a quantity of related terms within the text analysis information that are related to the search term.

11. The method of claim 10, wherein recommending the number of presentations includes recommending a schedule of events based on the search term.

12. The method of claim 10, wherein recommending the number of presentations includes recommending events that relate more closely to the search term and can be attended by a user over the period of time.

13. The method of claim 10, wherein a portion of the plurality of topics are presented at overlapping times during the period of time.

14. The system of claim 1, wherein the instructions are executable by the processing resource to display each of the number of topics as text with a text size that corresponds to a quantity of topic information relating to each corresponding topic.

15. The medium of claim 7, comprising instructions executable to display each of the number of topics as text with a text size that corresponds to a quantity of topic information relating to each corresponding topic.

16. The method of claim 10, further comprising:

displaying each of the number of topics as text with a text size that corresponds to a quantity of topic information relating to each corresponding topic.

* * * * *